Dec. 27, 1927. 1,654,298
G. N. MANISON ET AL
OUTLET VALVE
Filed May 21, 1921
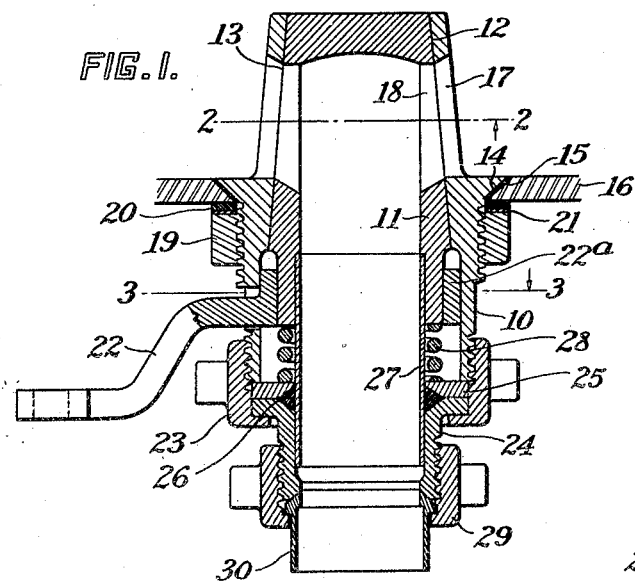
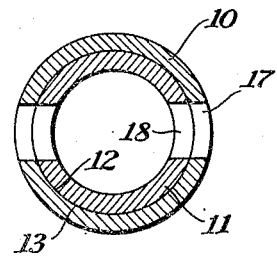
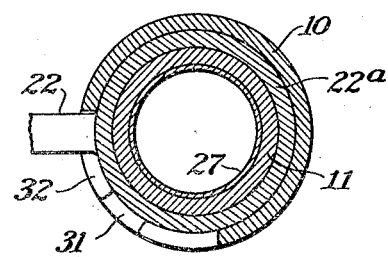
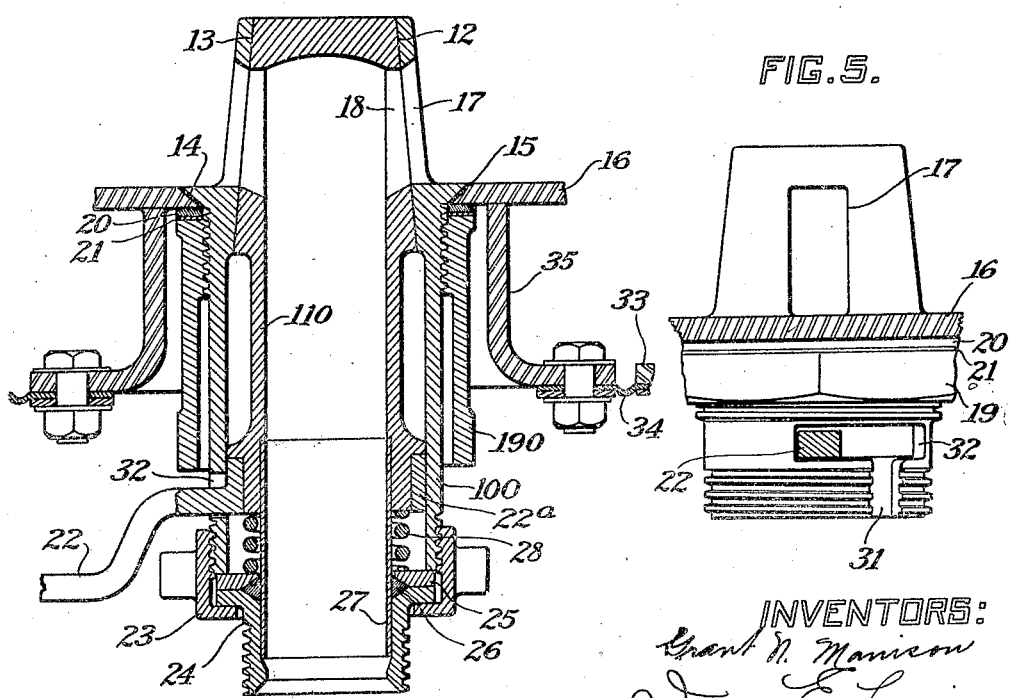
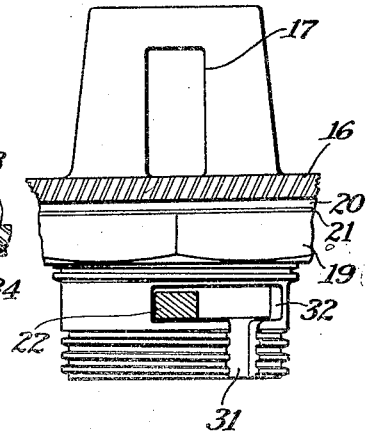
INVENTORS:
Grant N. Manison
Isaac E. Larvin Patented Dec. 27, 1927.

1,654,298

UNITED STATES PATENT OFFICE.

GRANT N. MANISON AND ISAAC E. COLVIN, OF ROCHESTER, NEW YORK, ASSIGNORS TO THE PLAUDLER COMPANY, OF ROCHESTER, NEW YORK.

OUTLET VALVE.

Application filed May 21, 1921. Serial No. 471,446.

This invention relates to outlet valves and one object thereof is to provide a valve which may be attached to the flat or concave bottom of a vessel and so arranged that the contents of the vessel may be drained completely when the valve is opened. A further object of the invention is to so construct the valve that all the liquid which enters it from the vessel will pass completely through and not be retained within the valve, whether the latter is open or shut. Still another object is to arrange the valve parts so that they may be readily cleaned and reassembled with a minimum of adjustment and fitting.

In the drawings:

Fig. 1 is a vertical section of a valve embodying this invention;

Fig. 2 is a horizontal cross section on the line 2—2 of Fig. 1;

Fig. 3 is a cross section on a line 3—3 of Fig. 1;

Fig. 4 is a vertical section of a modified form of the invention; and

Fig. 5 is a partial elevation of the valve, viewed from the left side of Fig. 1.

The valve comprises, in its essential elements, a body 10 and a revoluble plug 11, having corresponding tapered surfaces 12 and 13, respectively. The valve body preferably has a beveled lip 14 that rests on a gasket 15 in an opening through the vessel bottom 16. Ports 17 and 18 in the body and the plug are adapted to register in one position of the latter, to permit the contents of the vessel to pass into the interior of the plug and thence to the piping or discharge line that may be attached to its lower end, as will be explained.

The valve body is anchored to the bottom head 16 by a nut 19 that is screwed up on the threaded exterior of the body, against a gasket 20 and washer 21. The upper portion of the body, through which the ports 17 are cut, extends up into the vessel, and the lower edges of these ports lie flush with the bottom 16, so that all the liquid may run out when the ports are in registering position, or when the valve is open.

Means for operating the plug 11 to accomplish opening and closing of the valve are provided in the form of a lever or arm 22 that may be attached in any suitable manner to the lower end of the plug. A hub 22<sup>A</sup> on this arm fits closely within the body 10 and aids in guiding the plug so that the strain of movement will not come entirely on the tapered surfaces, which are ground to a fine finish in order to guard against leakage. The arm 22 may be actuated by any preferred connecting linkage.

To adapt the valve for connection to a pipe line into which the contents of the vessel may pass, a nut 23 is threaded upon the lower end of the body 10, and this nut carries a threaded bushing 24 and a washer 25. Between these two latter parts is a rubber gasket 26, which, when the nut 23 is set up, is squeezed against the exterior of a tube 27 that is fixed in the lower end of the plug 11. A spring 28 surrounds the tube 27, and is compressed between the washer 25 and the plug 11, so that the tapered surfaces 12 and 13 are retained in close contact as long as the nut 23 is in place. The spring 28 is just stiff enough to hold the plug 11 liquid-tight in the body 10, but still permitting it to be turned by the arm 22 against the friction of the tapered surfaces and of the gasket 26.

The thread on the bushing 24 may be suitable for connection to any desired type of piping. For instance, a second nut 29 may engage the threads on the bushing and serve to retain a ferrule that is adapted to receive the standard type of sanitary tubing in common use.

In this construction two objects are accomplished, viz: the liquid in the vessel may all run out through the ports in the valve; and when the latter is closed, all the liquid that is in it may run into the connected pipe line.

To separate the parts of the valve for cleaning it is necessary merely to remove the nuts 23 and 29, the bushing 24, gasket 26, washer 25, and spring 28. The plug may then be pulled down by turning it until the arm 22 enters the vertical open portion 31 (Fig. 5) of a T-shaped slot 32 in the body.

Fig. 4 illustrates a modified form of the invention, as applied to a jacketed vessel. The jacket 33 is shown connected to the vessel bottom through a flexible diaphragm 34 and a connector 35, but these form no part of the present invention. In order to accommodate the valve to the vessel, the body 100 and plug 110 are lengthened, and the set nut 190 is extended below the jacket far enough to be grasped by a wrench.

This invention is not limited to the precise constructions illustrated, but may be modified within the extent of the following claims.

We claim:—

1. An outlet valve for vessels, comprising a body seated in the bottom of the vessel and projecting inwardly therefrom and having ports in its inner portion, a hollow plug rotatable in the body and having ports corresponding to the body ports, means below the vessel for holding the plug in engagement with the body, means independent of said holding operating means and also accessible from below the vessel for rotating the plug, an extension on the body below said operating means for connection with a discharge line adapted to be held against rotation during rotation of the operating means, an extension on the plug fitting the body extension, and a compressible gasket between said extensions.

2. An outlet valve for vessels comprising a body seated in the bottom of the vessel and projecting inwardly therefrom and having ports in its inner portion, the lower edges of said ports being flush with the bottom of the vessel, a hollow plug rotatable in the body and having ports corresponding to the body ports and arranged in the same plane, a pipe connection on said body, an extension on the plug adapted to enter said pipe connection, a compressible gasket engaging said pipe connection, and means independent of said pipe connection and arranged intermediate the body and pipe connection for rotating the plug without rotation of the pipe connection.

3. An outlet valve for vessels comprising a body seated in the bottom of the vessel and projecting inwardly therefrom and having ports in its inner portion, the lower edges of said ports being flush with the bottom of the vessel, a hollow plug rotatable in the body and having ports corresponding to the body ports arranged in the same plane and open at its outer end and having a shoulder above said outer end, a compressible gasket surrounding the lower end of the plug, yieldable means interposed between said shoulder and gasket for compressing the latter against the plug and retaining the plug in contact with the body, and means movable independently of said last mentioned means for rotating the plug.

4. An outlet valve having a body provided with a tapered inner surface, a rotatable hollow plug having its outer surface in contact with the tapered inner surface of said body, said plug and body having lateral ports adapted to register with each other, a pipe connection on the lower end of the body spaced from the plug and having a gasket surrounding the plug between its ends, and means located between the gasket and inlet end of the plug for rotating the plug independently of the pipe connection without rotation of the pipe connection.

5. An outlet valve having a body with an internal tapered surface and lateral ports, a hollow plug fitting within said tapered surface and having an axial bore open at one end and closed at the other and also provided with lateral ports adapted to register with the ports in the body, resilient means engaging the open end of the plug for retaining it in contact with the tapered surface in the body, and means for rotating the plug located between the resilient means and the inlet end of the plug.

6. An outlet valve comprising a hollow body adapted to be secured in the bottom of a vessel to project inwardly therein and having lateral ports, a plug rotatable in said body and having ports adapted to register with the ports thereof, a pipe connection on said body arranged below the bottom of the vessel, means above the pipe connection for rotating the plug without rotation of the pipe connection and also arranged below the bottom of the vessel, and means accessible from the bottom of the vessel for disconnecting the pipe connection, plug and rotating means from the body.

7. An outlet valve comprising a hollow body adapted to project through the bottom of a vessel and having lateral ports within the vessel and a slot below the same, retaining means for the body threaded thereon above the slot and arranged to engage the bottom of the vessel, a plug rotatable in said body and having ports adapted to register with the ports in the body, and an operating device for rotating the plug extending through the slot in the body and limited in its movements by engaging the ends thereof, said slot being formed to permit the operating device to be detached by a downward movement therethrough.

8. An outlet valve comprising a hollow body adapted to project through the bottom of a vessel and having lateral ports within the vessel and a slot below the same, a plug rotatable in said body and having ports adapted to register with the ports in the body, an operating device engaging the plug and extending through the slot in the body, a coupling member depending from the body and means for retaining the plug in the body adapted to be supported by the coupling, said operating device being free to rotate without rotation of the coupling.

9. An outlet valve comprising a hollow body adapted to project through the bottom of a vessel and having lateral ports within the vessel and an open slot below the same, a plug rotatable in said body and having ports adapted to register with the ports in the body, an operating device engaging the plug and extending through the slot in the body held against rotation during rotation of the plug, a pipe connection on the body, and a single means for retaining the plug in the body, the operating device in the slot and the pipe connection on the body.

10. An outlet valve comprising a body adapted to project through the bottom of a vessel, and having lateral ports within the vessel, a hollow plug movable in said body and having ports adapted to register with the ports in the body, a pipe connection alined with the plug and secured on the body portion below the bottom of the vessel, and means accessible from below the vessel and operable independently of said pipe connection and without rotation thereon for operating the plug.

11. An outlet valve comprising a body adapted to be secured in the bottom of a vessel to project inwardly therefrom and having lateral ports on its inner end, a plug rotatable therein and having ports corresponding to the ports in the body, a compressible gasket surrounding the plug between its ends, resilient means engaging said gasket, a pipe coupling on the lower end of the body, means seated upon the pipe connection for retaining the plug in the body and compressing the resilient means to compress the gasket, and means for rotating the plug disposed independently of the plug retaining means.

12. An outlet valve for vessels comprising a tubular body having one end adapted for connection with a vessel and provided with a fluid passage, a pipe connection detachably secured on the other end of the body, a tubular valve member rotatable within the body to open and close said passage, said body being provided with a radial slot in its wall above said connection from which leads a longitudinally extending opening normally closed by the pipe connection and an operating member for rotating the valve adapted to project from the valve through the radial slot and arranged to be detached by movement through said longitudinally extending opening when the pipe connection is removed.

GRANT N. MANISON.
ISAAC E. COLVIN.

CERTIFICATE OF CORRECTION.

Patent No. 1,654,298.   Granted December 27, 1927, to

GRANT N. MANISON ET AL.

It is hereby certified that the name of the assignee in the above numbered patent should have been written and printed as "The Pfaudler Company" instead of "The Plaudler Company", as shown by the records of assignment in this office; and that the said Letters Patent should be read with this correction therein that the same may conform to the record of the case in the Patent Office.

Signed and sealed this 31st day of January, A. D. 1928.

Seal.

M. J. Moore,
Acting Commissioner of Patents.